United States Patent [19]
Mitsutake

[11] Patent Number: 6,157,419
[45] Date of Patent: *Dec. 5, 2000

[54] PROJECTOR

[75] Inventor: Hideaki Mitsutake, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/766,647

[22] Filed: Dec. 13, 1996

Related U.S. Application Data

[63] Continuation of application No. 08/446,329, May 22, 1995, abandoned, which is a continuation of application No. 08/073,999, Jun. 9, 1993, abandoned, which is a continuation of application No. 07/901,870, Jun. 22, 1992, abandoned.

[30] Foreign Application Priority Data

Jun. 24, 1991 [JP] Japan ................................ 3-151627

[51] Int. Cl.⁷ .................................................. G02F 1/1335
[52] U.S. Cl. ..................................................... 349/9; 349/5
[58] Field of Search ........................... 359/40, 41, 72, 359/73, 93, 86, 53, 63, 65; 345/101; 349/5, 8, 9

[56] References Cited

U.S. PATENT DOCUMENTS

| | | | |
|---|---|---|---|
| 4,541,691 | 9/1985 | Buoak | 359/73 X |
| 4,711,530 | 12/1987 | Nakanowatari et al. | 359/73 |
| 4,936,658 | 6/1990 | Tanaka et al. | |
| 5,083,855 | 1/1992 | Clark et al. | 359/72 |
| 5,105,289 | 4/1992 | Sonehara et al. | 359/40 |
| 5,107,356 | 4/1992 | Castleberry | 359/63 |
| 5,122,887 | 6/1992 | Mathewson | 359/53 |
| 5,126,864 | 6/1992 | Akiyama et al. | 359/73 |
| 5,157,523 | 10/1992 | Yamagishi et al. | 359/41 |
| 5,168,381 | 12/1992 | Walba | 359/63 |
| 5,172,222 | 12/1992 | Plantier et al. | 359/40 |
| 5,200,843 | 4/1993 | Karasawa et al. | 359/63 |
| 5,237,435 | 8/1993 | Kurematsu et al. | 359/41 |
| 5,247,378 | 9/1993 | Miller | 359/63 |
| 5,257,123 | 10/1993 | Shingaki et al. | 359/73 |

FOREIGN PATENT DOCUMENTS

| | | |
|---|---|---|
| 0 311116 | 7/1988 | European Pat. Off. . |
| 0247333 | 10/1987 | Japan . |
| 63-216026 | 9/1988 | Japan . |
| 2000828 | 5/1990 | Japan . |
| WO-88/06 391 | 8/1988 | WIPO . |

OTHER PUBLICATIONS

Communication of Notices of Opposition dated Apr. 15, 1997 for European Application No. 92110556.5–2205/0520369.

"A Polarization Transforming Optics For High Luminance LCD Projector", Shinsuke Shikama, *The Tenth International Display Research Conference*, pp. 64–67.

Masami Himuro, Japanese Laid–Open Application No. 61–90584, May 8, 1986.

Patent Abstracts of Japan, vol. 10, No. 268, Dec. 16, 1986.

S. Shikana, et al., "Polarization Transforming Optics For High Luminance LCD Projection", *Proceedings Of Eurodisplay*, pp. 64–67.

*Primary Examiner*—James Dudek
*Attorney, Agent, or Firm*—Morgan & Finnegan L.L.P.

[57] ABSTRACT

In a projector, wherein the polarized states of a plurality of color lights illuminating image forming means differ from the polarized states of image lights projected onto a projection surface and the image lights of respective colors projected onto the projection surface have a common polarized state, means for varying the polarized state is disposed in the optical path of each of the color lights.

25 Claims, 8 Drawing Sheets

PROJECTOR

This is a continuation of application Ser. No. 08/446,329, filed on May 22, 1995 now abandoned, which is a continuation of application Ser. No. 08/073,999, filed on Jun, 9, 1993 now abandoned, which is a continuation of application Ser. No. 07/901,870, filed on Jun. 22, 1992 now abandoned.

BACKGROUND OF THE INVENTION

1. Field of the Invention

This invention relates to a projector.

2. Related Background Art

A liquid crystal light value as the image forming means of a projector is often of the twist nematic type (hereinafter referred to as the TN type. This TN type liquid crystal, as is well known, is great in field angle characteristic and considerably differs in contrast depending on the direction in which it is seen (see *Appl. Phys. Lett.* 38 (1981), 497). Therefore, in a direct view liquid crystal display device wherein a liquid crystal light value is directly observed, the directions of liquid crystal molecules, a polarizer and an analyzer are adjusted in accordance with this characteristic.

Referring to FIGS. 1A and 1B of the accompanying drawings which shows this situation, the visual angle 44 of the observer 42 is inclined by an angle θ with respect to the normal 43 to a direct view liquid crystal display device 41 shown in FIG. 1A, and usually the area around this visual angle θ is the view field area. Accordingly, in order to adjust the field angle characteristic of the TN type liquid crystal to this area, use is made of a construction as shown in FIG. 1B wherein the directions of transmission polarization of a polarizer 45 and an analyzer 49 and the directions of orientation 46 and 48 of liquid crystal molecules 47 at the opposite ends of the liquid crystal layer thereof are inclined by 45° with respect to a horizontal axis.

In a projector, the angular expanse of a light beam incident on liquid crystal is smaller than in the direct view type, and also for an improvement in the quality of image (particularly contrast), a similar construction is often used and there is also obtained a secondary effect such as a reduction in cost by production facilities being made common.

Also, in recent years, various polarizing illumination devices for converting indefinite polarized light from a light source into linearly polarized light having a particular direction of polarization have been proposed as means for enhancing the luminance of a projector and increasing the efficiency of light utilization of the projector, but for the reason set forth above, the linearly polarized light emitted from those polarizing illumination devices must have its direction of polarization inclined by 45° with respect to said horizontal axis.

As a method of inclining the direction of polarization of linearly polarized light emitted from a polarizing illumination device, there are conceived polarizing conversion systems as shown, for example, in FIGS. 2 and 3 of the accompanying drawings. In FIG. 2 which shows only the essential portions of a polarizing illumination device described in Japanese Laid-Open Patent Application No. 61-90584, indefinite polarized light from a light source (not shown) is divided into two linearly polarized components S and P by the multi-layer film 1001 of a polarizing beam splitter, and the polarized component S is bent in the same direction of travel as the polarized component P by the total reflection surface 1002 of a rectangular prism, whereafter it has its direction of polarization rotated in the same direction of polarization as the polarized component P by a half wavelength optical phase plate 1003a. The two light beams which have been made to have the same direction of travel and the same direction of polarization in this manner are caused to enter a half wavelength optical phase plate 1003b, whereby the directions of polarization of the two light beams can be inclined in a direction depending on the optical axis of the half wavelength optical phase plate 1003b.

FIG. 3 shows an example in which quarter wavelength optical phase plates are used instead of half wavelength optical phase plates. This example is the same as the example shown in FIG. 2 in that the polarized component S is bent in the same direction of travel as the polarized component P by the total reflection surface of the rectangular prism 1002, but a quarter wavelength optical phase plate 1112a is disposed on the optical paths of two light beams so that said two light beams may become circularly polarized lights and further, a quarter wavelength optical phase plate 1112b is disposed so that said two circularly polarized light beams may become linearly polarized lights.

FIG. 4 of the accompanying drawings schematically shows a construction in which the polarizing illumination device shown in FIG. 2 or 3 is applied to a color projector. The reference numeral 31 designates a polarizing element shown in FIG. 2. White linearly polarized light emitted from the polarizing element 31 is resolved into three colors, red, green and blue, by a dichroic mirror 32 reflecting red and transmitting green and blue therethrough, a dichroic mirror 33 reflecting blue and transmitting green therethrough and a total reflection mirror 34, and the respective lights are transmitted through liquid crystal light valves 7R, 7G, 7B and polarizing plates 8R, 8G, 8B, and thereafter are again synthesized by a total reflection mirror 35, a dichroic mirror 36 reflecting blue and transmitting red therethrough and a dichroic mirror 37 reflecting green and transmitting red and blue therethrough.

The synthesized light is projected onto a screen, not shown, by a projection lens 10.

Accordingly, in this color projector, not only the efficiency of light utilization can be increased, but also the direction of polarization of the polarized illuminating light can be adjusted to the direction of orientation of liquid crystal molecules.

The system shown in FIG. 4, however, suffers from the following problems. The optical phase plate exhibits wavelength dependency and therefore, when an attempt is made to change the direction of polarization of light of a wide band like white light into a certain state, if for example, the optical phase plate is designed for the wavelength of the G component of white light, it will become impossible to shift the phase by the same amount as for the G component, for the B and R components having wavelengths differing from the wavelength of the G component. Accordingly, almost all part of the G component has its direction of polarization set to a predetermined state, while considerable parts of the B and R components have their directions of polarization not set to this state.

The polarizing conversion system is a system for supplying light having a particular direction of polarization and thus, light which does not have this direction of polarization is not utilized. Accordingly, considerable parts of the B and R components are losed due to the wavelength dependency of the optical phase plate and moreover, the light from the projector becomes greenish. Also, for a similar reason, considerable parts of the G and R components will be losed if the optical phase plate is designed for the wavelength of the B component of white light, and considerable parts of the B and G components will be losed if the optical phase plate is designed for the wavelength of the R component of white light.

SUMMARY OF THE INVENTION

The present invention has been made in order to solve the above-noted problems, and provides a projector in which the polarized states of a plurality of color lights illuminating image forming means differ from the polarized states of image lights projected onto a projection surface and the image lights of respective colors projected onto said projection surface have a common polarized state, characterized in that means for varying the polarized state is disposed in the optical path of each of the color lights.

The present invention also provides a projector having image forming means for forming a plurality of color images, illuminating means for illuminating said image forming means with each color light, and projection means for projecting each of the color images, characterized in that optical means for turning the direction of polarization by about 45° is disposed in the optical path of said each color light.

DESCRIPTION OF THE PREFERRED EMBODIMENTS

Figure 5:
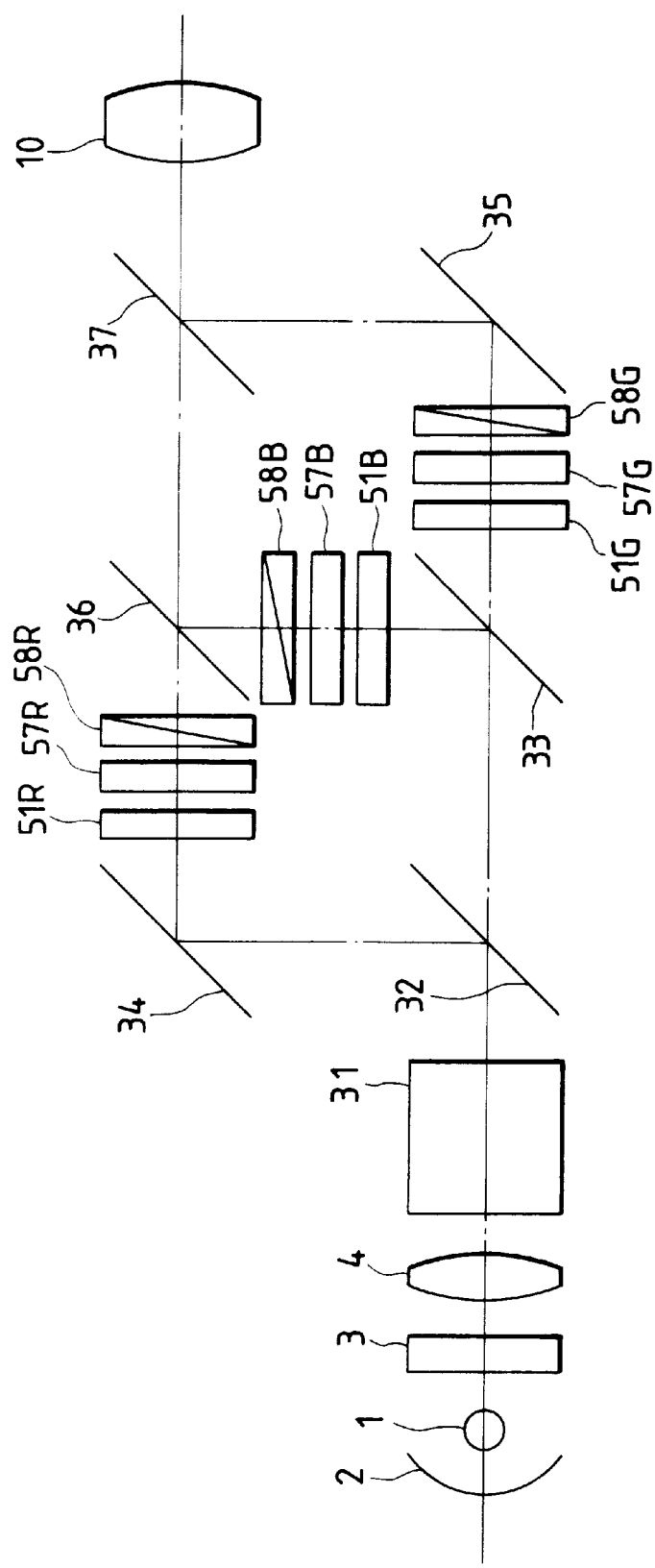
FIG. 5 schematically shows the consturction of a projection display device according to an embodiment of the present invention.
Figure 6:
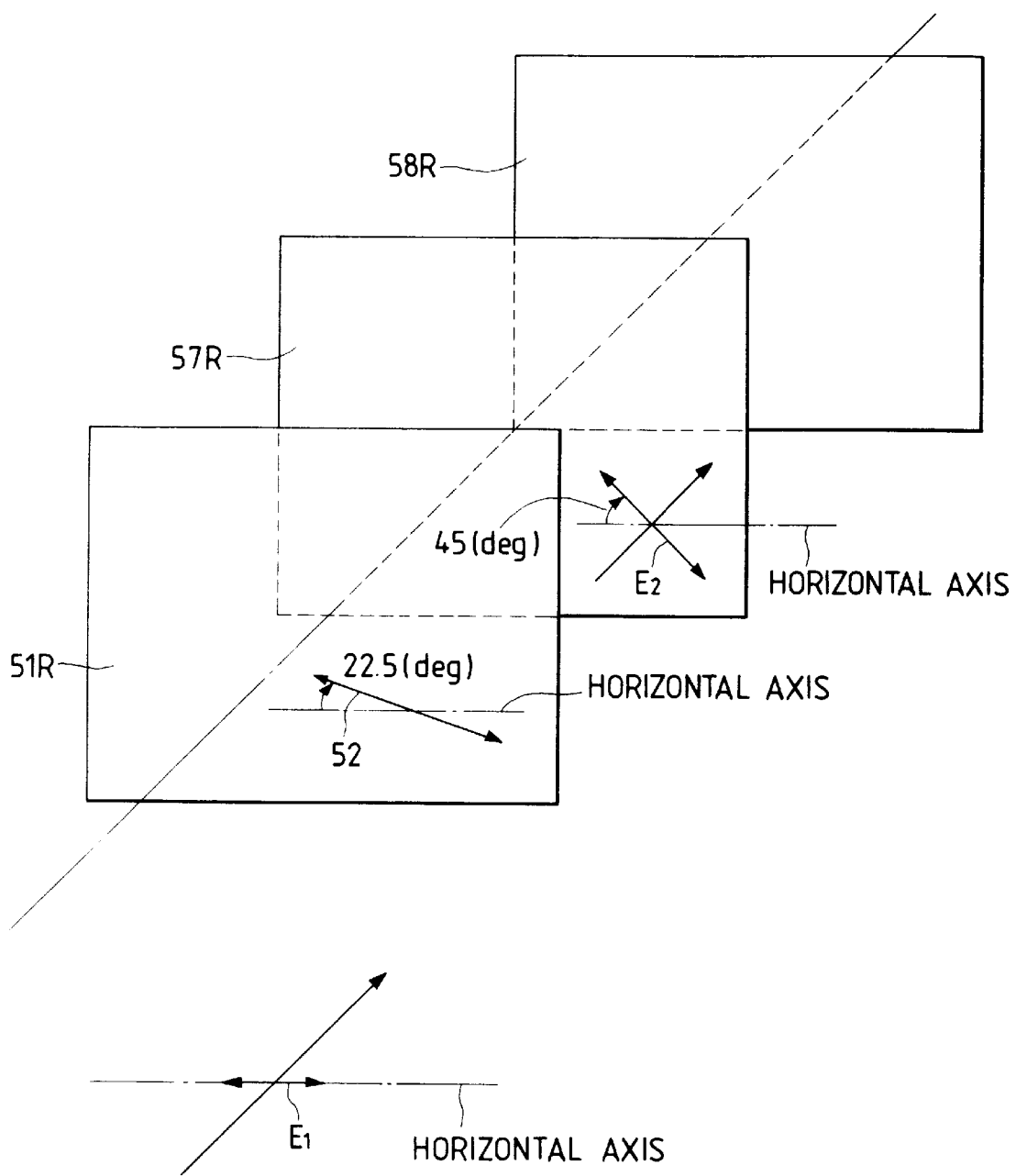
FIG. 6 illustrates the actions of the essential portions of the FIG. 5 embodiment.

FIG. 5 schematically shows the consturction of a color image projector according to an embodiment of the present invention. The portions of this projector which are common to those of the prior-art examples are given the same reference numerals. The polarizing element 31 corresponds to the portion excluding the half wavelength optical phase plate 1003b in FIG. 2. Light from a light source 1 enters a condenser lens 4 via a reflecting mirror 2 and a heat cut filter 3. A parallel light beam emergent from the condenser lens 4 is converted by the polarizing element 31 into linearly polarized light (P-polarized light) which, in this case, is perpendicular to the direction of travel and polarized in a direction in the plane of the drawing sheet of FIG. 5. White linearly polarized light emergent from the polarizing element 31 is resolved into three colors, red, green and blue, by a dichroic mirror 32 reflecting red and transmitting green and blue therethrough, a dichroic mirror 33 reflecting blue and transmitting green therethrough and a total reflection mirror 34, and the respective color lights are converted by half wavelength optical phase plates 51R, 51G and 51B into linearly polarized lights having their directions of polarization inclined by 45° with respect to the plane of the drawing sheet of FIG. 5, whereafter they pass through liquid crystal light values 57R, 57G and 57B having their molecule orientation axes inclined by 45° with respect to the plane of the drawing sheet of FIG. 5, and further pass through polarizing plates 58R, 58G and 58B. Taking the red color as an example, the action thereof will hereinafter be described with reference to FIG. 6.

Figure 1A:
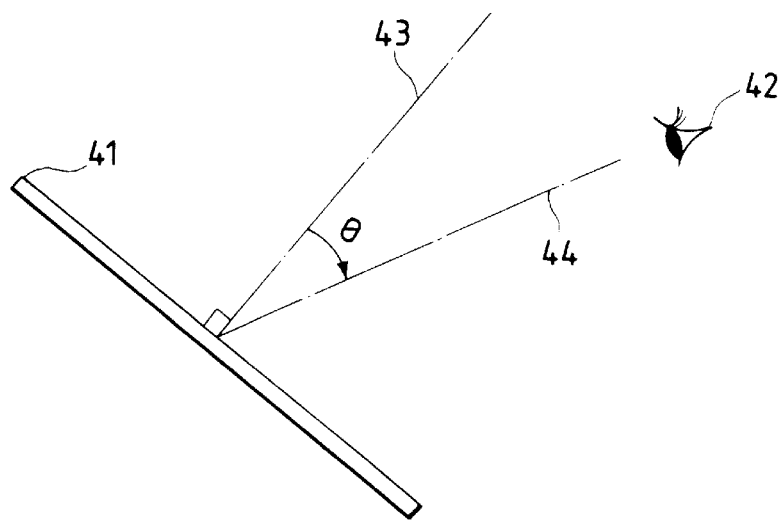
FIGS. 1A and 1B are illustrations of a direct view liquid crystal display device.
Figure 1B:
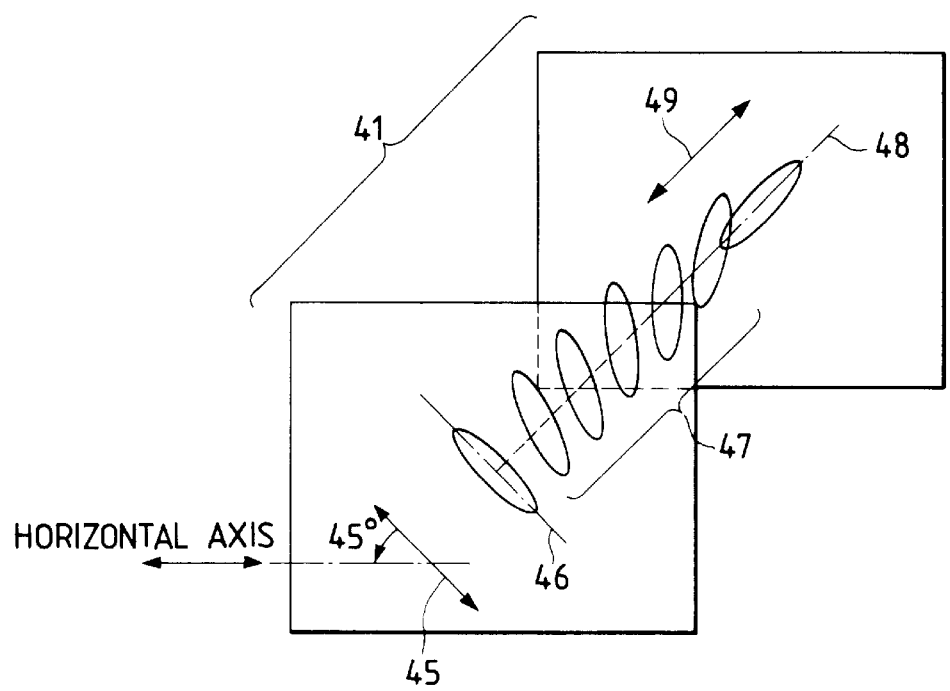

Incident light comprising linearly polarized light E1 parallel to the horizontal axis passes through a half wavelength optical phase plate 51R having its optical axis 52 inclined by 22.5° and has its direction of polarization rotated by 45° (E2), whereafter it is modulated in conformity with an image signal by the liquid crystal light value 57R comprising a liquid crystal construction shown in FIG. 1B, and passes through the polarizing plate 58R acting as an analyzer. The half wavelength optical phase plate 51R is selected such that in the wavelength range of the red light (generally 600–700 nm), retardation becomes approximate to the half wavelength.

This also holds true of the green light and the blue light.

The respective color lights modulated by corresponding liquid crystal light valves are again synthesized by a total reflection mirror 35, a dichroic mirror 36 reflecting blue and transmitting red therethrough and a dichroic mirror 37 reflecting green and transmitting red and blue therethrough. The synthesized light is projected onto a screen, not shown, by a projection lens 10.

In the present embodiment, the white light is first divided into red and green and blue components, and thereafter is divided into blue and green, whereas the order of the color resolution and color synthesis is not restricted to the present construction. Also, in the construction shown in FIG. 5, half wavelength optical phase plates are provided for red, green and blue, respectively, but a half wavelength optical phase plate common to green and blue may be provided between the dichroic mirrors 32 and 33. However, as for the blue light, the wavelength dependency of the difference in refractive index is liable to become great and therefore, where the half wavelength optical phase plate is made common to two colors, the combination of red and green is more desirable.

Figure 7:
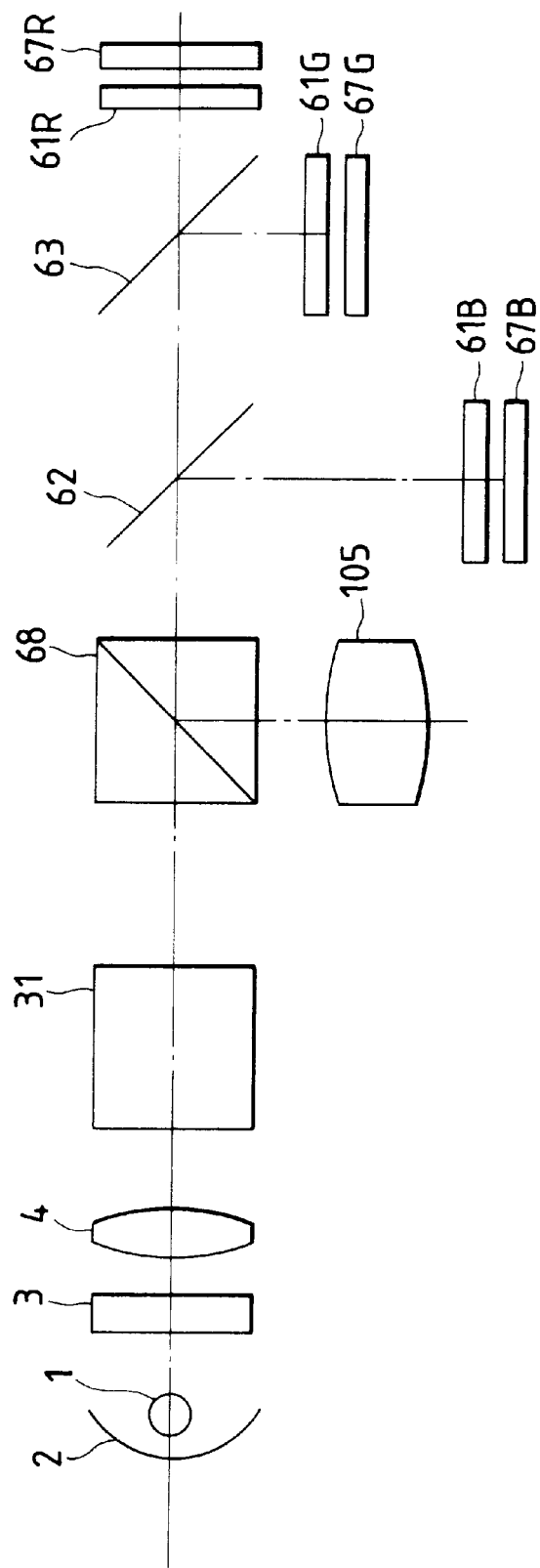
FIG. 7 schematically shows a projection display device according to another embodiment of the present invention.

FIG. 7 schematically shows the construction of another embodiment of the present invention. In this embodiment, portions common to those in the previous embodiment are given the same reference numerals. P-polarized light emergent from the polarizing element 31 passes through a polarizing beam splitter 68, whereafter it is resolved into three colors, red, green and blue, by dichroic mirrors 62 and 63, and the three color lights reciprocally travel between half wavelength optical phase plates 61R, 61G, 61B and reflection type liquid crystal light valves 67R, 67G, 67B. These reflection type liquid crystal light valves each have the function of inclining P-polarized light by 45° in conformity with an image signal and therefore, the P-polarized light is rotated by 90° by reciprocally travelling between the half wavelength optical phase plates and the reflection type liquid crystal light valves, and becomes S-polarized light. In this manner, a mixture of the P-polarized light and the S-polarized light is combined by the dichroic mirrors 62 and 63 in conformity with the image signal, and the S-polarized component is reflected by the polarizing beam splitter 68 and is projected onto a screen, not shown, by the projection lens 105. On the other hand, the P-polarized component returns to the polarizing element 31 side. As the reflection type liquid crystal light valves 67R, 67G and 67B, use can be made of liquid crystal of the double refraction modulation type such as 45° TN type liquid crystal, and the half wavelength optical phase plates 61R, 61G and 61B are selected so that the incident polarized light may be one suitable for each liquid crystal system.

Also, in recent years, light valves using ferroelectric liquid crystal elements have been proposed as liquid crystal light valves.

In an optical modulation element (hereinafter referred to as the "FLC element") using ferroelectric liquid crystal (hereinafter referred to as "FLC"), a system in which a liquid crystal layer is formed between two plates parallel to each other and having a very small spacing (e.g. 1–2 $\mu$m) therebetween and a bistable state is created by the use of the surface actions of the two plates (see SSFLC. *Appl. Phys. Lett.* 36 (1890) 899) is expected to have various applications because of its rapid responsiveness and memorizing property.

The bistable type FLC element exhibits two stable states in a direction in which the axis of liquid crystal molecule differs by a predetermined angle relative to the axial direction (the direction of rubbing or the like) of an orientation acting surface formed as by rubbing on that side of each of the plates sandwiching the liquid crystal layer therebetween which is adjacent to the liquid crystal layer. This angle is called the cone angle (hereinafter represented by $\theta_c$)

When a voltage is applied in a direction perpendicular to the liquid crystal layer surface of the FLC element, the FLC shifts from one stable state to the other stable state. This change corresponds to rotating one major axis of a refractive index elliptical body of a material having refractive index anisotropy by an angle $2\theta_c$ in the liquid crystal layer surface. The axis of liquid crystal molecule and one major axis of the refractive index elliptical body sometimes do not strictly coincide with each other, but yet here for simplicity, the two are regarded as being in the same direction. Accordingly, when polarized light enters the FLC element having a thickness corresponding to the action of a half wavelength optical phase plate, the polarizing rotational actions by the two bistable states to the incident polarized light differ by $4\theta_c$ from each other. If the FLC element is sandwiched between polarizing elements (such as polarizing plates) of cross Nicol or parallel Nicol arrangement, when $4\theta_c=90°$ ($\theta_c=22.5°$), the ON-OFF ratio (the transmittance ratio and the contrast) of the quantity of transmitted light in the two bistable states becomes highest.

Now, the cone angle $\theta_c$ in the FLC element has considerably great temperature dependency. Therefore, even if the FLC element is disposed so that at a certain temperature, the direction of polarization of incident light and the axis of liquid crystal molecule in one stable state may coincide with each other, at another temperature the direction of polarization of the incident light and the direction of the axis of liquid crystal molecule in one stable state will be deviated from each other by a variation in the cone angle. Accordingly, the incident light will be subjected to the polarizing rotational action and part of the light will be transmitted through an analyzer. Therefore, when the polarizer and the analyzer are disposed in cross Nicol arrangement, a sufficiently dark state cannot be realized and a reduction in contrast will result.

On the other hand, when the polarizer and the analyzer are disposed in parallel Nicol arrangement, a sufficiently bright state cannot be realized and likewise a reduction in contrast will result. An embodiment which can prevent such a reduction in contrast will be shown below.

Figure 8:
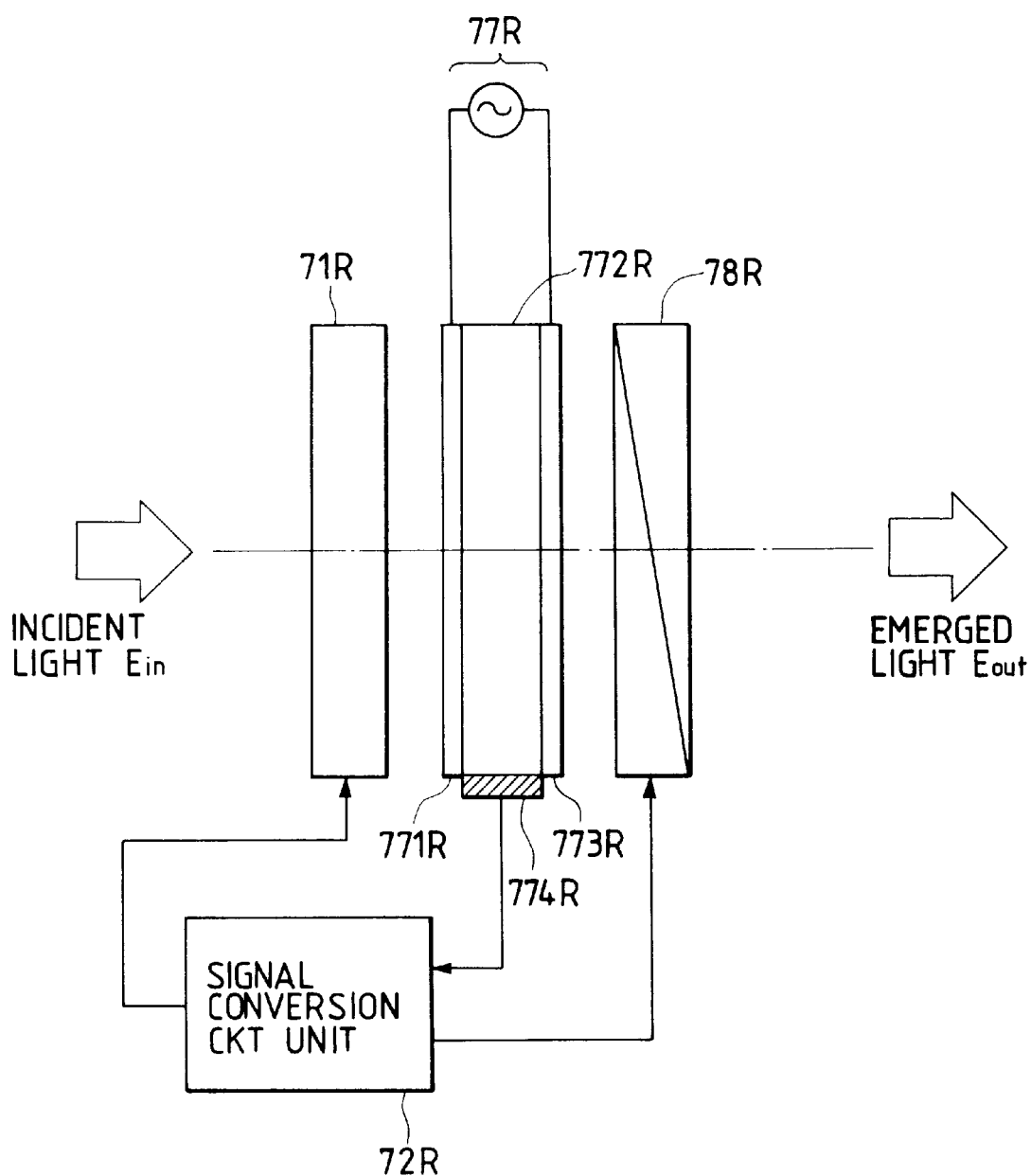
FIG. 8 shows the construction of the essential portions of another embodiment.

Referring to FIG. 8 which is a partial schematic diagram showing another embodiment of the present invention, there are shown only portions differing from those in the embodiment shown in FIG. 5. In this embodiment, portions corresponding to the half wavelength optical phase plate 51R (51G, 51B), the light valve 57R (57G, 57B) and the analyzer 58R (58G, 58B) in FIG. 5 are replaced by others. In FIG. 8, the reference character 71R designates a half wavelength optical phase plate for rotating the direction of polarization of incident light, the reference character 77R denotes an FLC element for controlling (modulating) the polarized state of the incident linearly polarized light in conformity with an applied voltage and emitting the light, the reference character 78R designates an analyzer for detecting only a polarized component from the light modulated by the FLC element 77R, and the reference character 72R denotes a signal conversion circuit unit including an ROM memorizing therein a table in which the temperature of liquid crystal is made in advance to correspond to the angles of rotation of the half wavelength optical phase plate 71R and the analyzer 78R. The FLC element 77R comprises transparent substrates 771R and 773R opposed to each other, an FLC molecule layer 772R interposed between the transparent substrates, and a temperature detecting portion 774R for detecting the temperature of the FLC molecule layer 772R.

The incident polarized light passed through the half wavelength optical phase plate 71R is modulated by the FLC element 77R, has only its component in the direction of the optical axis of the analyzer 78R transmitted and becomes emergent light. The FLC molecule layer 772R assumes one of two bistable states by changing the magnitude or direction of an electric field applied between transparent electrically conductive layers, not shown, formed on the inner sides of the substrates 771R and 773R.

The temperature information of the FLC molecule layer detected by the temperature detecting portion 774R is passed through the signal conversion circuit unit 72R and becomes a signal for controlling the rotation of the half wavelength optical phase plate 71R and the analyzer 78R.

Figure 9:
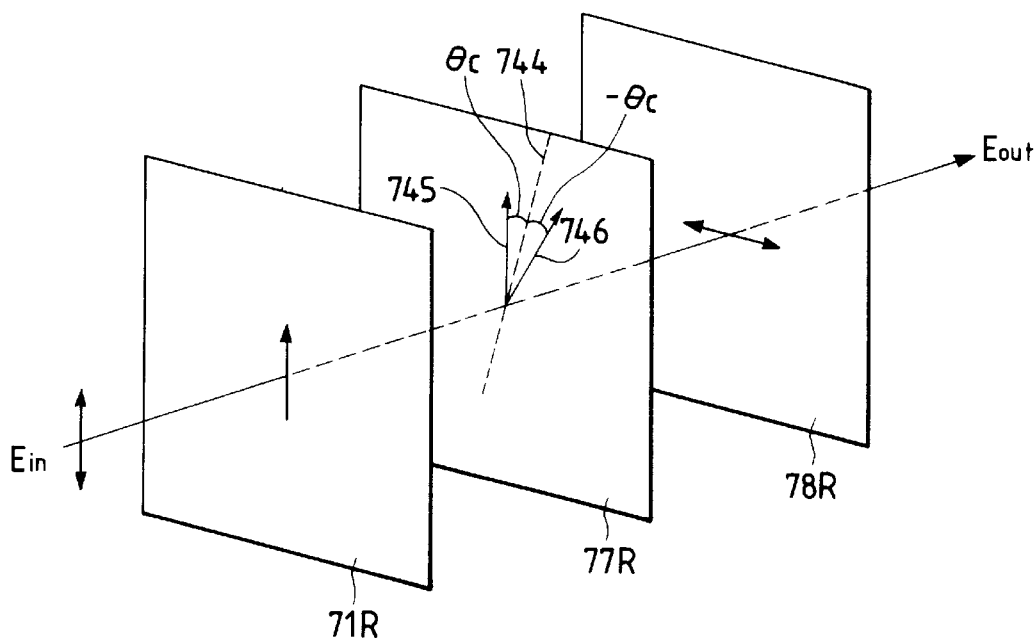
FIG. 9 illustrates the actions of the essential portions of the FIG. 8 embodiment.

FIG. 9 shows the state of light ray on each layer in the construction of FIG. 8 at a certain temperature A [degrees]. FIG. 9 shows the state of light ray on each layer in the construction of FIG. 8 at a certain temperature B [degrees] (A≠B). The reference numeral 744 in FIG. 9 and 10 indicates the orientation acting axis (rubbing direction) of the FLC molecule layer 772R. In these figures, as regards the unit of angle, the clockwise direction with respect to the optical axis will hereinafter be shown as negative.

In FIG. 9, polarized incident light $E_{in}$ passes through the half wavelength optical phase plate 71R having its optical axis set so that the direction of polarization of the incident light $E_{in}$ and the direction of the axis of liquid crystal molecule may coincide with each other, whereafter it enters the FLC molecule layer 772R as polarized light having a direction of rotation 745 (the axis of liquid crystal molecule in one of the bistable states) rotated from the orientation acting axis 744 of the FLC molecule layer 772R by the cone angle $\theta_c$ at the temperature A [degrees]. If at this time, no electric field is applied to the FLC molecule layer 772R, the polarizing rotational action of the incident light does not take place in the FLC molecule layer 772 and the light rays are all cut by the analyzer and perfect black is expressed. On the other hand, if an electric field is applied to the FLC molecule layer 772R, the axis of liquid crystal molecule in the FLC molecule layer 772R faces a direction 746 and therefore, the incident light $E_{in}$, after passed through the FLC molecule layer 772R having a thickness corresponding to the action of the half wavelength optical phase plate, becomes light having had its direction of polarization rotated by $-4\theta_c$. The ratio of light passed through the analyzer to light arriving at the analyzer at this time is expressed as $\sin^2(4\theta_c)$.

Figure 10:
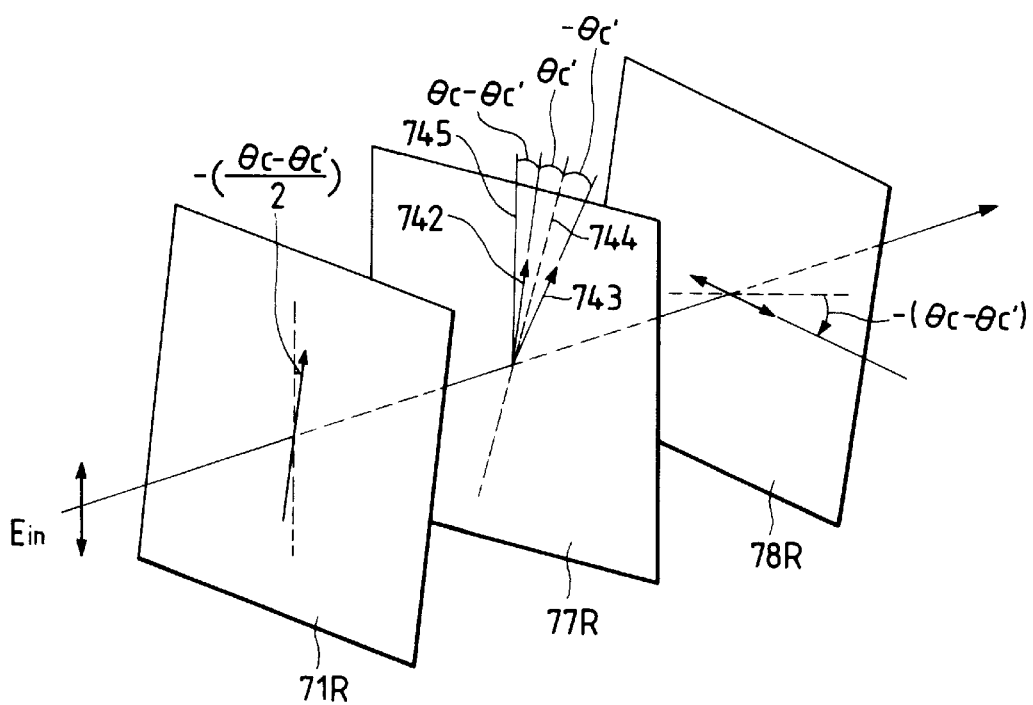
FIG. 10 illustrates the actions of the essential portions of the FIG. 8 embodiment.

Next, when the temperature of the FLC molecule layer 772R is B [degrees], as shown in FIG. 10, the incident light $E_{in}$ passes through the half wavelength optical phase plate 71R, whereafter in the FLC molecule layer 772R, it enters the FLC element 77R as light having a direction of polarization coincident with a direction 745 rotated from the orientation acting axis 744 by the cone angle $\theta_c$ at the temperature A [degrees]. If at this time, no electric field is applied to the FLC molecule layer 772R, the axis of liquid crystal molecule in one of the bistable states of FLC in the FLC molecule layer 772R becomes an axis 742, i.e., an axis facing a direction rotated from the orientation acting axis by a cone angle $\theta_c'$ at B [degrees], and after the incident light $E_{in}$ has passed through the FLC element 77R, the polarizing rotational action to the polarized light $E_{in}$ becomes $-2(\theta_c-\theta_c')$ on the opposite sides of the axis 742. However, if the half wavelength optical phase plate 71R is rotated by $-\{(\theta_c-\theta_c')/2\}$ from the state of A [degrees] and disposed, the polarized light $E_{in}$ is subjected to a polarizing rotational action by $-(\theta_c-\theta_c')$ and therefore, the direction of polarization of the incident light onto the FLC element 77R coincides with the axis of liquid crystal molecule 742 in one of the bistable states of FLC in the FLC molecule layer 772R. Accordingly, the FLC layer 77R does not cause the polarizing rotational action. At this time, by the analyzer 78R being rotated by $-(\theta_c-\theta_c')$ from the state of A [degrees], the cross Nicol state is kept and the emergent light from the FLC element 77R is all cut in the analyzer 78R, and perfect black is expressed. On the other hand, if an electric field is applied to the FLC molecule layer 772R, the axis of liquid crystal molecule becomes an axis 743, and when the half wavelength optical phase plate 71R is rotated as described above, the rotational action of the polarized light by the FLC molecule layer 772R is $-4\theta_c'$ and further, when the analyze 78R is rotated as described above, the proportion of the transmitted light of the light which has arrived at the analyzer is expressed as $\sin^2(4\theta_c')$.

The element in the signal conversion circuit unit may also be any other functionally similar element than the ROM. The temperature detecting portion 774R need not always be attached to the FLC molecule layer 772R, but may be attached to the analyzer 78R adjacent thereto.

As described, in the present construction, even if temperature changes, perfectly coincident black states can be reproduced and thus, there can be provided an element which displays an image of high contrast and good quality within a wide temperature range.

Also, in the case of the form shown in FIG. 5, the polarizing plate on the incidence side of the liquid crystal light valve is unnecessary in principle, but for the purpose of removing flare light or the like, a polarizing plate having an appropriate transmission axis may be inserted between the polarizing element 31 and the liquid crystal light valve 57R, 57G or 57B. For example, if a polarizing plate is placed between the half wavelength optical phase plate 51 and the liquid crystal light valve 57, the transmission axis of the polarizing plate can be brought into accord with the optical axis of the half wavelength optical phase plate 51, and if a polarizing plate is placed between the half wavelength optical phase plate 51 and the polarizing element 31, the transmission axis of the polarizing plate can be brought into accord with the direction of polarization of the linearly polarized light from the polarizing element 31. Again in these cases, it is desirable that there be a mechanism for adjusting the direction of the transmission axis.

Where use is made of FLC having great temperature dependincy like this, linearly polarized light which irradiates the liquid crystal device can be adjusted to a desired direction of polarization correspondingly to any change in temperature.

As described above, in the present invention, linearly polarized light which irradiates a light valve using an element such as TN type liquid crystal whose optical axis on the incident light side differs from the direction of polarization of the linearly polarized light which is incident light can be changed to a desired direction of polarization.

Figure 2:
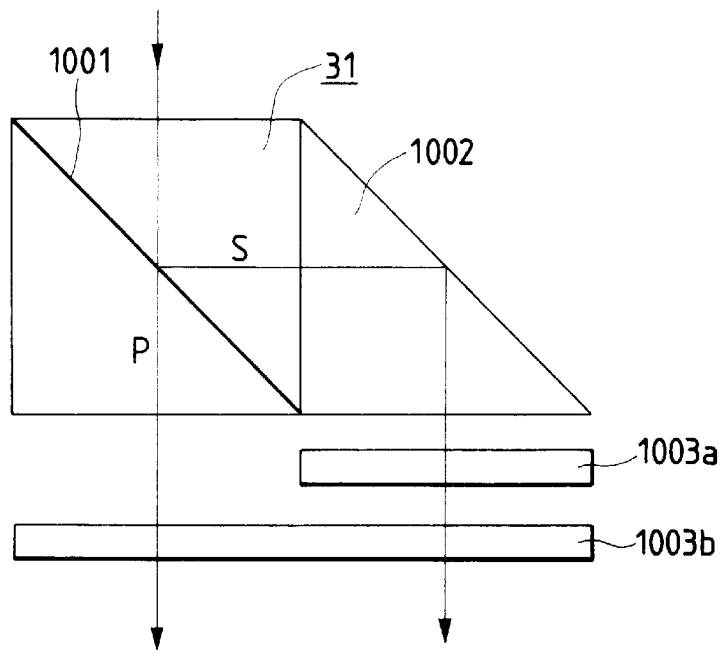
FIG. 2 is a schematic view of a projection display device according to the prior art.
Figure 3:
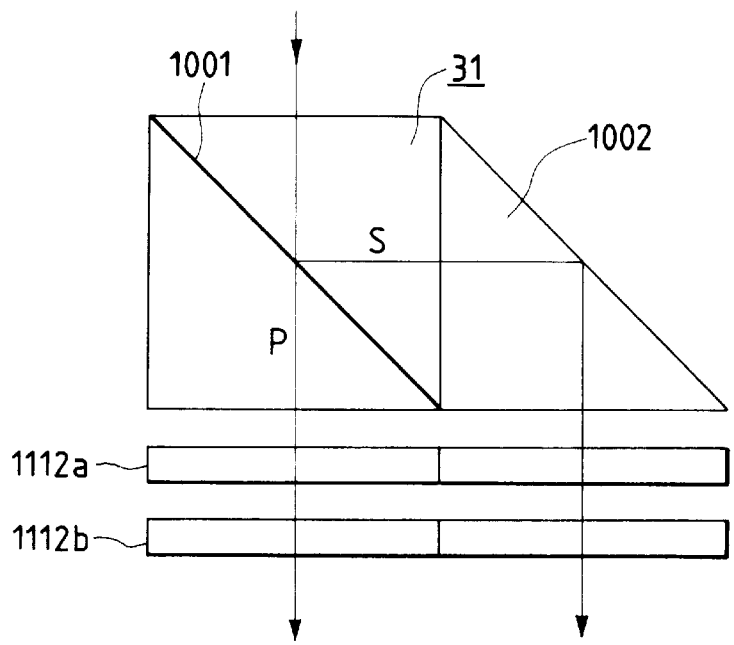
FIG. 3 is a schematic view of a projection display device according to the prior art.
Figure 4:
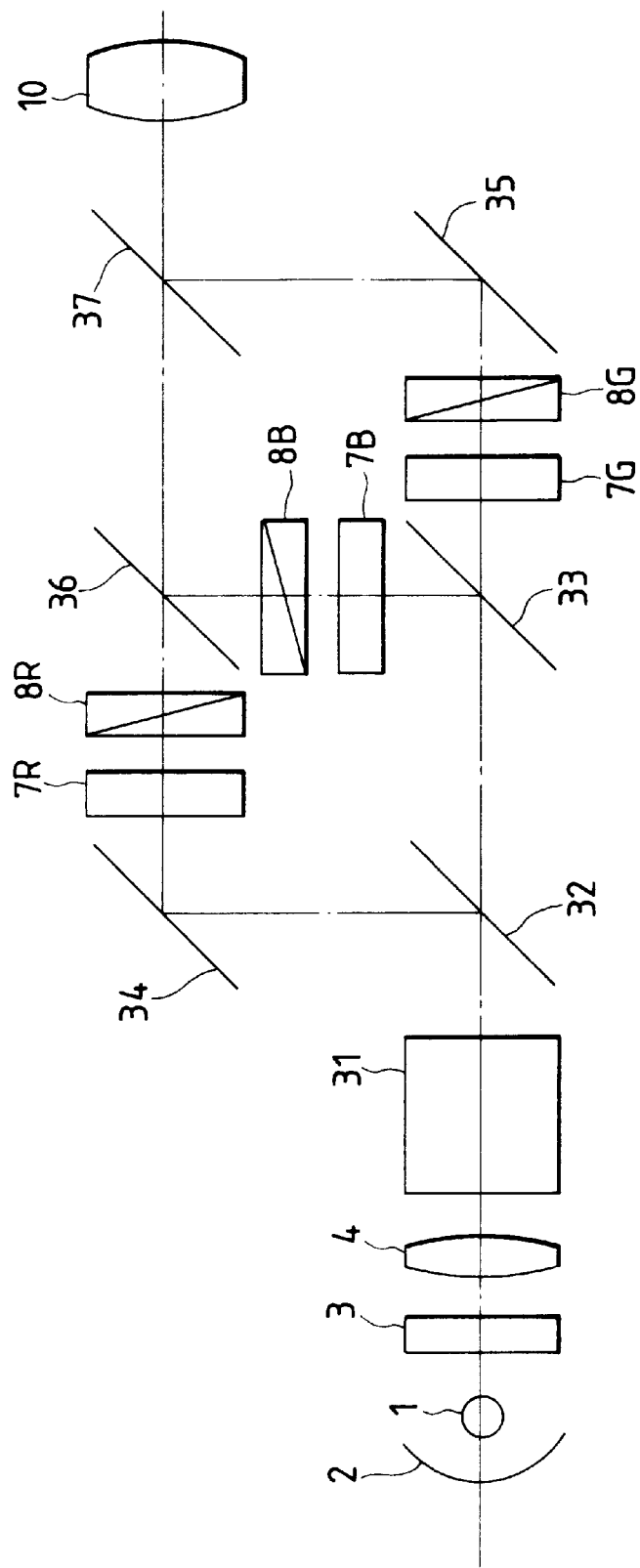
FIG. 4 is a schematic view of a color projection display device according to the prior art.

The polarizing element 31 is not limited to that shown in FIG. 2, but use can be made of any element which can obtain linearly polarized light or circularly polarized light. For example, where as the polarizing element 31, use is made of an element from which the quarter wavelength optical phase plate 112b in FIG. 3 is eliminated and which can obtain circularly polarized light, a quarter wavelength optical phase plate can be employed instead of the aforementioned half wavelength optical phase plate 51 and if the optical axis thereof is set to a desired direction, circularly polarized light can be converted into linearly polarized light in the desired direction of polarization as previously described and the light valve can be irradiated with it.

While the present invention has hitherto been described with respect to a case where white light is resolved into three primary colors, red, green and blue, the present invention can be likewise carried out in a form wherein white light is resolved into a greater number of colors or two colors.

In the embodiments shown above, use is made of liquid crystal light valves, but other light valve systems using polarized light, such as PLZT, are also effective as means for selecting the direction of polarization of incident light.

Also, in the above-described embodiments, a half wavelength optical phase plate is used to rotate polarized light by 45°, use may also be made of 45° twist nematic liquid crystal or the like.

As described above, according to the present invention, in a projector wherein the polarized states of a plurality of color lights illuminating image forming means differ from the polarized states of image lights projected onto a projection surface and the image lights of respective colors projected onto the projection surface have a common polarized state, means for varying the polarized state is disposed in the optical path of each color light.

Also, according to the present invention, in a projector having image forming means for forming a plurality of color images, illuminating means for illuminating said image forming means with each color light, and projection means for projecting each color image, optical means for turning the direction of polarization by about 45° is disposed in the optical path of said each color light, and this leads to the following effects.

By providing color resolving means, and a polarizing element using an optical phase plate in the optical of each of resolved color lights:

1. Use can be made of linearly polarized light in a direction of polarization matching with the characteristic of the image forming means;

2. A phase plate adapted for each wavelength range can be selected and therefore, it is easy to keep the linear polarizability of polarized light caused to enter the image forming means and accordingly, any reduction in the contrast of image can be prevented;

3. The characteristic of a dichroic mirror as the color resolving means differs considerably depending on the direction of polarization and accordingly, if the direction of polarization is rotated by 45° by a half wavelength optical phase plate before color resolution, the direction of polarization will deviate considerably from 45° depending on the wavelength after the passage through a dichroic mirror, and this causes a reduction in contrast and irregularity of color, whereas the construction of the present invention can prevent this;

4. The direction of polarization of each color light can be independently adjusted in accordance with the characteristic of each light valve and further, the irregularity of the individual difference between the liquid crystal light valves can be coped with, and this adjusting mechanism can be provided on one or both of the optical phase plate and the polarizing plate as the analyzer; and 5. The optical axis of the optical phase plate can be set so that correspondingly to a change in the temperature of the liquid crystal device such as TN type liquid crystal or FLC, there may be obtained inearly polarized light in a direction of polarization best suited for the direction of orientation axis of the incidence side liquid crystal molecules at said temperature and thus, there can be provided an element which displays images of high contrast and good quality within a wide temperature range, and not only any change in temperature but also any change in humidity or any change in the orientation axis of liquid crystal molecules caused by deterioration with time can be coped with by making the optical axis of the optical phase plate movable.

The present invention can be applied to not only TN type liquid crystal and FLC but also every device that requires linearly polarized light.

What is claimed is:

1. A projector comprising:

a light source emitting light of undefined polarization;

polarizing means for converting said light into linearly or circularly polarized light;

light separating means for separating the light from said polarizing means into first, second and third colored lights having different colors from one another;

three modulation means, each receiving one of said colored lights, for converting portions of light having a first linear polarization into portions of a second polarization different from said first linear polarization and for selecting one of said first and second polarizations, each modulation means comprising, disposed in succession along the optical path of the correponding colored light, a nematic type liquid crystal panel for rotating polarization directions of the portions of said first linear polarization, and polarization analyzer means for transmitting only one of said first and second polarizations, combining means for combining the colored lights passed through said nematic type liquid crystal panels projection means for projecting said combined lights; and three polarization converting means each of which is disposed between said light separating means and corresponding one of said three modulation means, for converting said linearly or circularly polarized light into the light having the first linear polarization.

2. A projector according to claim 1, wherein said polarizing means is adapted to output circularly polarized light, and each of said polarization converting means is a quarter wavelength optical phase plate.

3. A projector according to claim 1, wherein said polarizing means is adapted to output linearly polarized light and said polarization converting means rotates the direction of polarization of each of said colored lights by about 45°.

4. A projector according to claim 3, wherein each of said polarization converting means is a half wavelength optical phase plate.

5. A projector according to claim 4, further comprising detecting means for detecting any change in the temperature of a member constituting said selective polarization rotating means and wherein said optical phase plate is rotated about the optical axis thereof in conformity with an output signal from said detecting means.

6. A projector according to claim 1, wherein each of said selective polarization rotating means comprises a twisted nematic liquid crystal light valve.

7. A projector comprising:

a light source emitting light of undefined polarization;

polarizing means for changing said light into linearly polarized light which is polarized in a horizontal direction;

light separating means for separating the light from said polarizing means into first, second and third colored lights having different colors from one another;

three modulation means, each receiving one of said colored lights, for converting portions of light having a first linear polarization into portions of a second polarization different from said first linear polarization and for selecting one of said first and second polarizations, each modulation means comprising, disposed in succession along the optical path of the corresponding colored light, a nematic type liquid crystal panel for rotating polarization directions of the portions of said first linear polarization, and polarization analyzer means for transmitting only one of said first and second polarizations, wherein the direction of said first linear polarization is different from said horizontal direction, combining means for combining the colored lights, passed throug said nematic type liquid crystal panels projection means for projecting said combined lights; and three polarization converting means each of which is disposed between said light separating means and corresponding one of said three modulation means, for converting said linearly polarized light into the light having the first linear polarization.

8. A projector according to claim 7, wherein said polarizing means is adapted to output linearly polarized light and each of said polarization converting means rotates the direction of polarization of each of said colored lights by about 45°.

9. A projector according to claim 8, wherein each of said polarization converting means is a half wavelength optical phase plate.

10. A projector according to claim 9, further comprising detecting means for detecting any change in the temperature of a member constituting said selective polarization rotating means and wherein said optical phase plate is rotated about the optical axis thereof in conformity with an output signal from said detecting means.

11. A projector according to claim 7, wherein each of said selective polarization rotating mean comprises a twisted nematic liquid crystal light valve.

12. A projector comprising:

a light source emitting light of undefined polarization;

polarizing means for converting said light into linearly polarized light;

light separating means for separating the light from said polarizing means into first, second and third colored lights having different colors from one another;

three modulation means, one disposed in each of said colored lights, for converting portions of light having a first linear polarization into portions of a second polarization different from said first linear polarization and for selecting one of said first and second polarizations, the direction of said first linear polarization being 45° with respect to the polarization direction of said linearly polarized light, each modulation means comprising, disposed in succession along the optical path of the corresponding colored light beam, a nematic type liquid crystal panel for rotating the polarization directions of the portions of said first linear polarization direction, and polarization analyzer means for transmitting only one of said first and second polarizations;

combining means for combining the colored lights;

projection means for projecting said combined beams; and three polarization converting means, each of which is disposed between said light separating means and a corresponding one of said three modulation means for converting said linearly polarized light into the light having the first linear polarization by rotating the polarization direction of said linearly polarized light by 45°.

13. A projector comprising:

an illuminating optical system including polarizing means for converting non-polarized polarized light from a light source into polarized light and color separating means for separating the polarized light into a plurality of lights differing in color from one another;

image forming means, provided on each optical path of said plurality of lights, for forming image light by changing a polarization state of light with a member which has an optical anisotrophy and of which a direction of an optic axis is variable; and a projection optical system for combining and projecting said image lights from said image forming means provided on the respective optical paths of said plurality of lights, wherein said member having optical anistropy is adapted to receive linearly polarized light, the polarization direction of which is inclined with respect to a horizontal axis, wherein said polarizing means is adapted to produce polarized light which is P- polarized light or S-polarized light with respect to a dichroic mirror of said color separating means, and wherein polarization changing means is provided on each optical path of said plurality of lights for changing said P-polarized light or S-polarized light to said linearly polarized light the polarization direction of which is inclined with respect to the horizontal axis.

14. A projector comprising:

an illuminating optical system including polarizing means for converting non-polarized light from a light source into polarized light and color separating means for separating the polarized light into a plurality of lights differing in color from one another;

image forming means, provided on each optical path of said plurality of lights, for forming image light by changing a polarization state of light using a member which has an optical anisotropy and of which a direction of an optic axis is variable; and a projection optical system for combining and projecting said image lights from said image forming means provided on the respective optical paths of said plurality of lights, wherein said member having optical anisotropy is adapted to receive linearly polarized light, the polarization direction of which is inclined with respect to a horizontal axis, wherein said polarizing means is adapted to produce polarized light, the polarization direction of which is not inclined with respect to the horizontal axis, and wherein polarization changing means is provided on each optical path of said plurality of lights for changing the polarized light produced by said polarizing means to said linearly polarized light, the polarization direction of which is inclined with respect to the horizontal axis.

15. A projector according to claims 13 or 14, wherein said color separating means produces color lights of red, green and blue.

16. A projector according to any one of claims 13 or 14, wherein said polarizing means includes:

means for separating the light from said light source into two polarized lights, the polarization direction of which are orthogonal to each other;

means for causing the polarization directions of said two linearly polarized lights to coincide with each other.

17. A projector according to any one of claims 13 or 14, wherein said projection optical system includes color combining means for combining said image lights from each of said image forming means and a projection lens for projecting the combined image light.

18. A projector according to any one of claims 13 or 14, wherein said member having optical anisotropy is a twist nematic type liquid crystal in which the liquid crystal molecule closet to light incident side is orientated in 45 degrees with respect to said horizontal axis, and said twist nematic type liquid crystal is adapted to receive the linearly polarized light, the polarization direction of which coincides with the orientation direction of the liquid crystal molecule closet to the light incident side.

19. A projection according to claim 18, wherein polarization changing means is a halfwave plate in which the optic axis is oriented at 22.5 degrees with respect to the polarization direction of the polarization light produced by said polarizing means.

20. A projector according to any one of claims 13 or 14, wherein said member having optical anistrophy is a bistable type ferro-dielectric liquid crystal which is adapted to receive the linearly polarized light which is polarized in a direction in a same as an orientation direction of the liquid crystal in one of stable states.

21. A projector according to claim 20, wherein said polarization changing means is rotatable about an optical axis.

22. A projector according to claim 21, wherein temperature variation of said bistable type ferro-dielectric liquid crystal is detected and said polarization changing means is rotated about the optical axis in correspondence with the detection result.

23. A projector according to any one of claims 13 or 14, wherein said member having optical anisotrophy is a liquid crystal or PLZT.

24. A projector according to any one of claims 13 or 14, wherein said polarization changing means is a twist nematic liquid crystal.

25. A projector according to claim 14, wherein said polarizing means produces polarized light which is P polarized light or S polarized light with respect to a dichroic mirror of said color separating means.

* * * * *